(12) United States Patent
Matsushima et al.

(10) Patent No.: US 8,235,414 B2
(45) Date of Patent: Aug. 7, 2012

(54) GLOVE DOOR-INSTALLED KNEE AIR BAG APPARATUS

(75) Inventors: Hitoshi Matsushima, Aichi-ken (JP); Osamu Fukawatase, Aichi-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 108 days.

(21) Appl. No.: 12/743,467

(22) PCT Filed: Nov. 12, 2008

(86) PCT No.: PCT/JP2008/070560
§ 371 (c)(1), (2), (4) Date: May 18, 2010

(87) PCT Pub. No.: WO2009/069466
PCT Pub. Date: Jun. 4, 2009

(65) Prior Publication Data
US 2010/0276914 A1 Nov. 4, 2010

(30) Foreign Application Priority Data
Nov. 30, 2007 (JP) .................................. 2007-310728

(51) Int. Cl.
*B60R 21/206* (2011.01)
(52) U.S. Cl. .................. 280/728.2; 280/730.1
(58) Field of Classification Search ............... 280/728.2, 280/730.2, 752, 753
See application file for complete search history.

(56) References Cited

U.S. PATENT DOCUMENTS

| 6,092,836 | A | 7/2000 | Saslecov |
| 6,276,713 | B1 | 8/2001 | Duletzke |
| 6,299,209 | B1 | 10/2001 | Ankersson et al. |
| 6,302,437 | B1 * | 10/2001 | Marriott et al. ............... 280/732 |
| 6,705,638 | B2 | 3/2004 | Abe et al. |

(Continued)

FOREIGN PATENT DOCUMENTS

DE    42 09 604 A1    10/1992
(Continued)

OTHER PUBLICATIONS

Extended European Search Report for EP Appl. No. 08853594.3 dated Jan. 12, 2012.
(Continued)

*Primary Examiner* — Joseph Rocca
(74) *Attorney, Agent, or Firm* — Finnegan, Henderson, Farabow, Garrett & Dunner, LLP

(57) ABSTRACT

In a glove door-installed knee air bag apparatus, a stud bolt of an inflator is fixed to an inflator supporting member in a state that the stud bolt is inclined in a vertical direction relative to a general plane of a glove door inner member. Due to the structure, a thickness W0 of an air bag module measured at the inflator installing portion is made small. The inflator supporting member includes a first portion and a second portion. In a case where a hook portion is formed in the first portion, the number of parts can be reduced. In a case where the inflator is located at a lower portion of a housing space, a handling force for opening and closing the glove door is light. In a case where the first portion comprises a bottom wall of the air bag casing and the second portion comprises a side wall of the air bag casing, the number of parts is reduced.

31 Claims, 11 Drawing Sheets

U.S. PATENT DOCUMENTS

| | | |
|---|---|---|
| 7,261,318 B2 | 8/2007 | Enders |
| 7,878,532 B2 * | 2/2011 | Sasaki et al. ............... 280/730.1 |
| 7,946,611 B2 * | 5/2011 | Chavez et al. ............. 280/728.2 |
| 2003/0120409 A1 | 6/2003 | Takimoto et al. |
| 2005/0023802 A1 | 2/2005 | Enders et al. |
| 2006/0279073 A1 * | 12/2006 | Hotta et al. ................ 280/730.1 |
| 2011/0227318 A1 * | 9/2011 | Schorle et al. ............. 280/728.2 |

FOREIGN PATENT DOCUMENTS

| | | |
|---|---|---|
| DE | 100 03 706 | 8/2000 |
| EP | 1 262 379 | 12/2002 |
| JP | 2002-356137 | 12/2002 |
| JP | 2003-170799 | 6/2003 |
| JP | 2003-205818 | 7/2003 |
| JP | 2005-193817 | 7/2005 |

OTHER PUBLICATIONS

Notification of Reasons for Refusal for JP Appl. No. 2009-543749 dated Jan. 31, 2012.

* cited by examiner

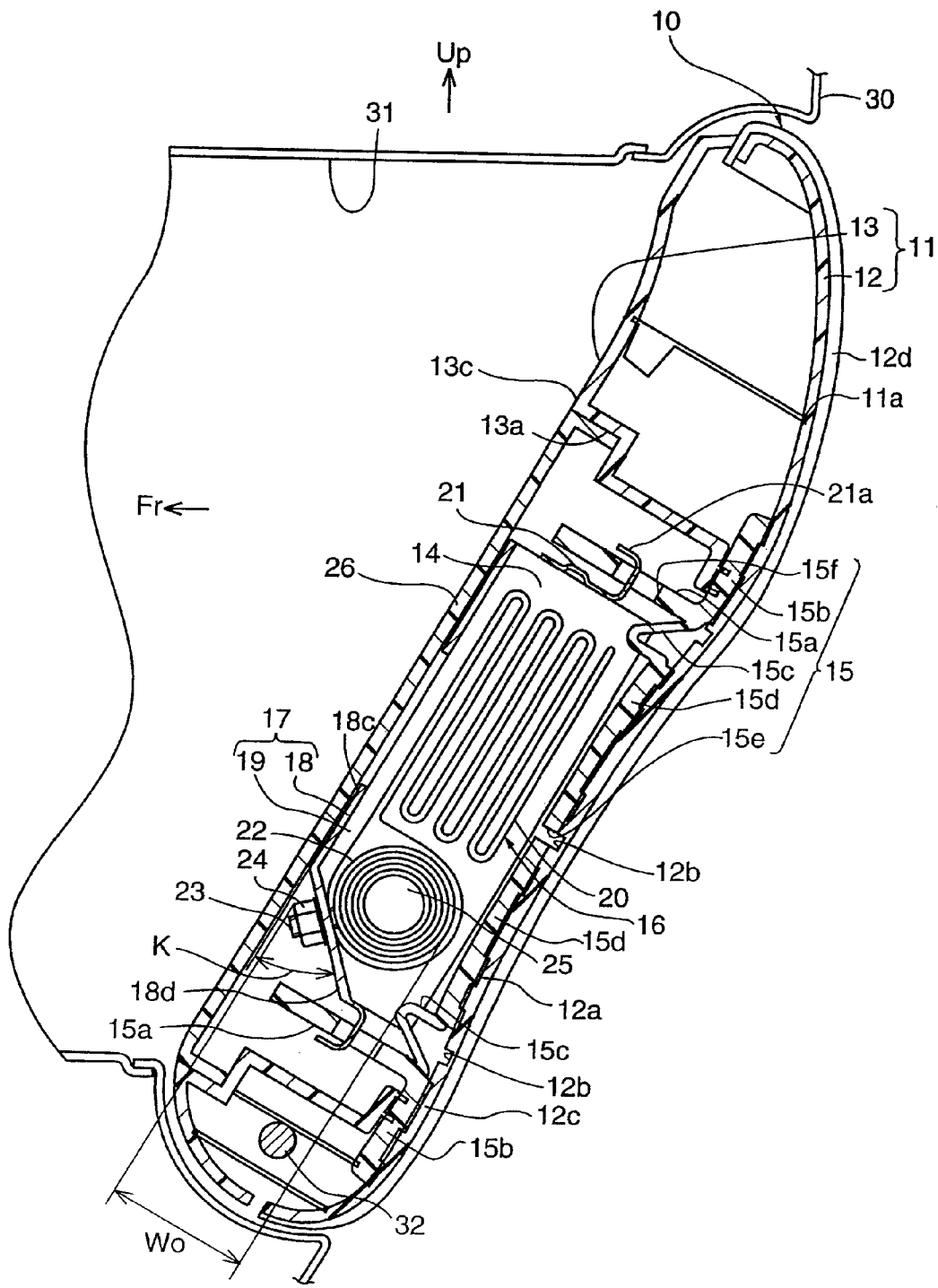
[FIG. 1]

[FIG. 2]
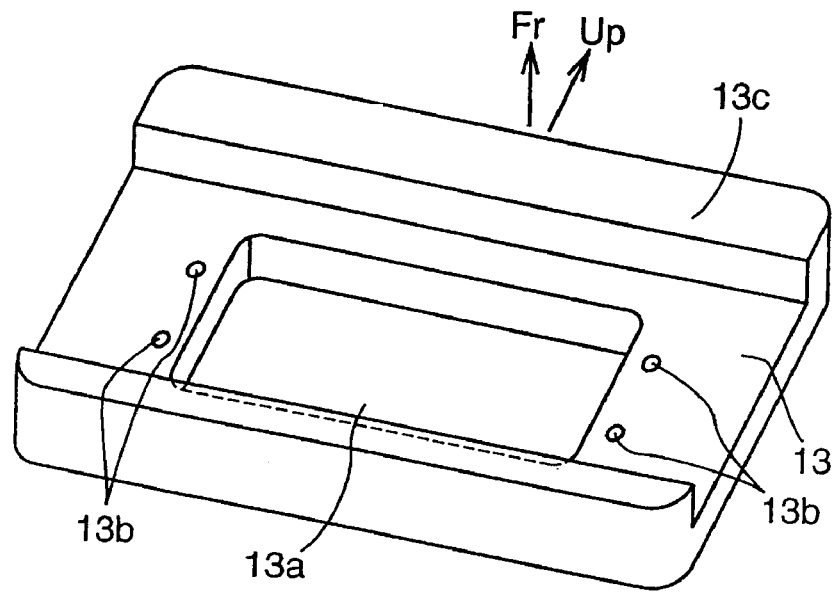
[FIG. 3]
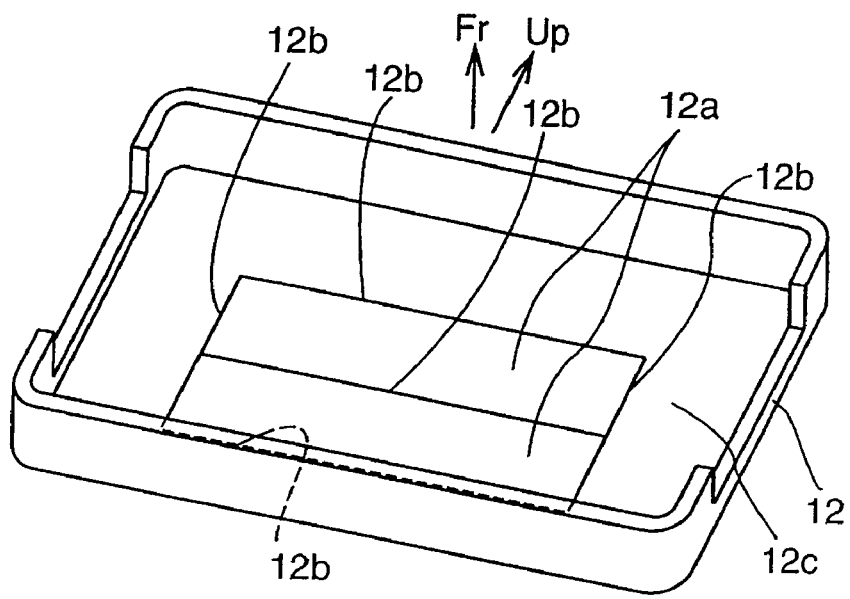

[FIG. 4]
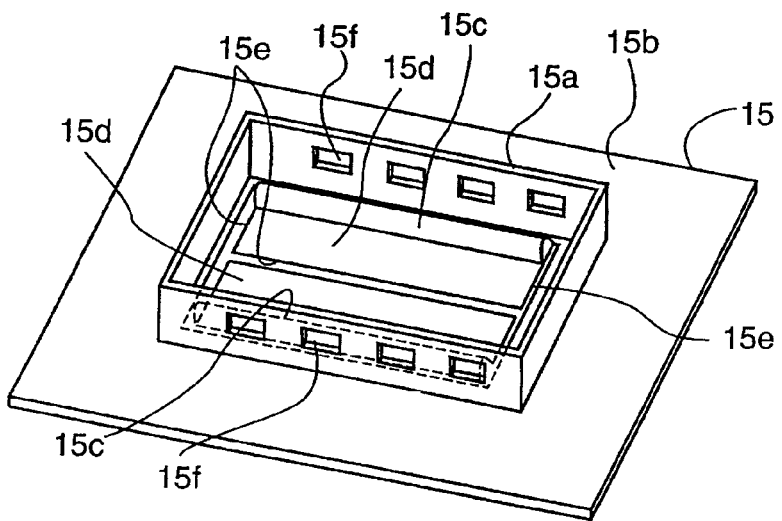
[FIG. 5]
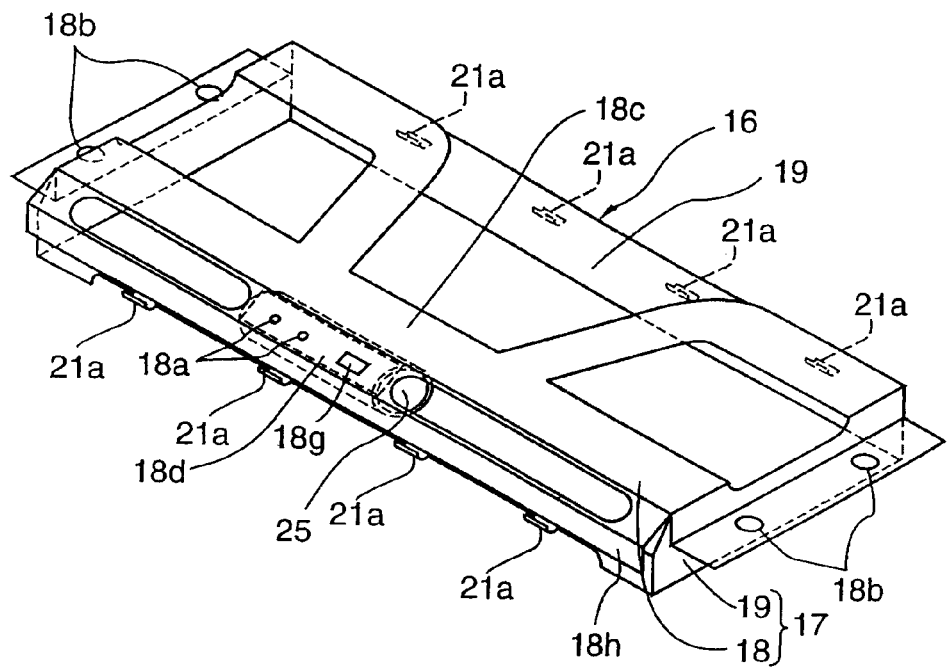

[FIG. 6]
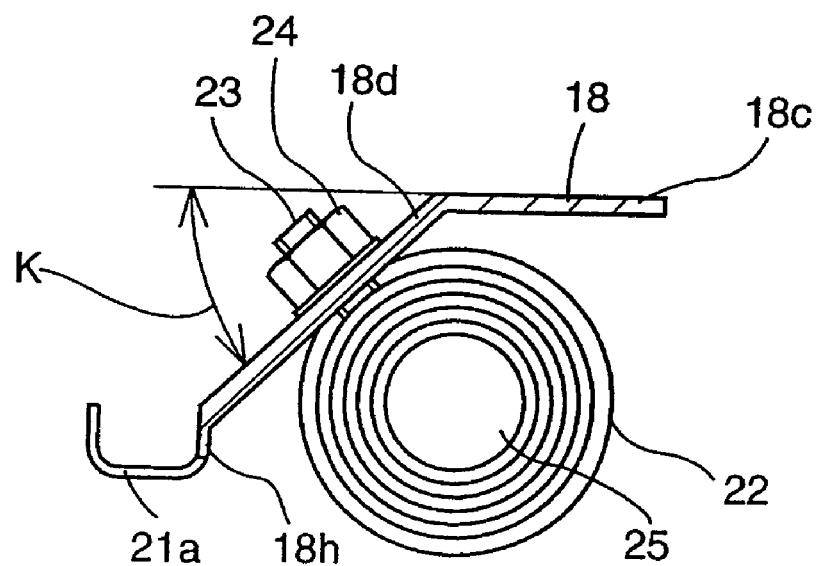

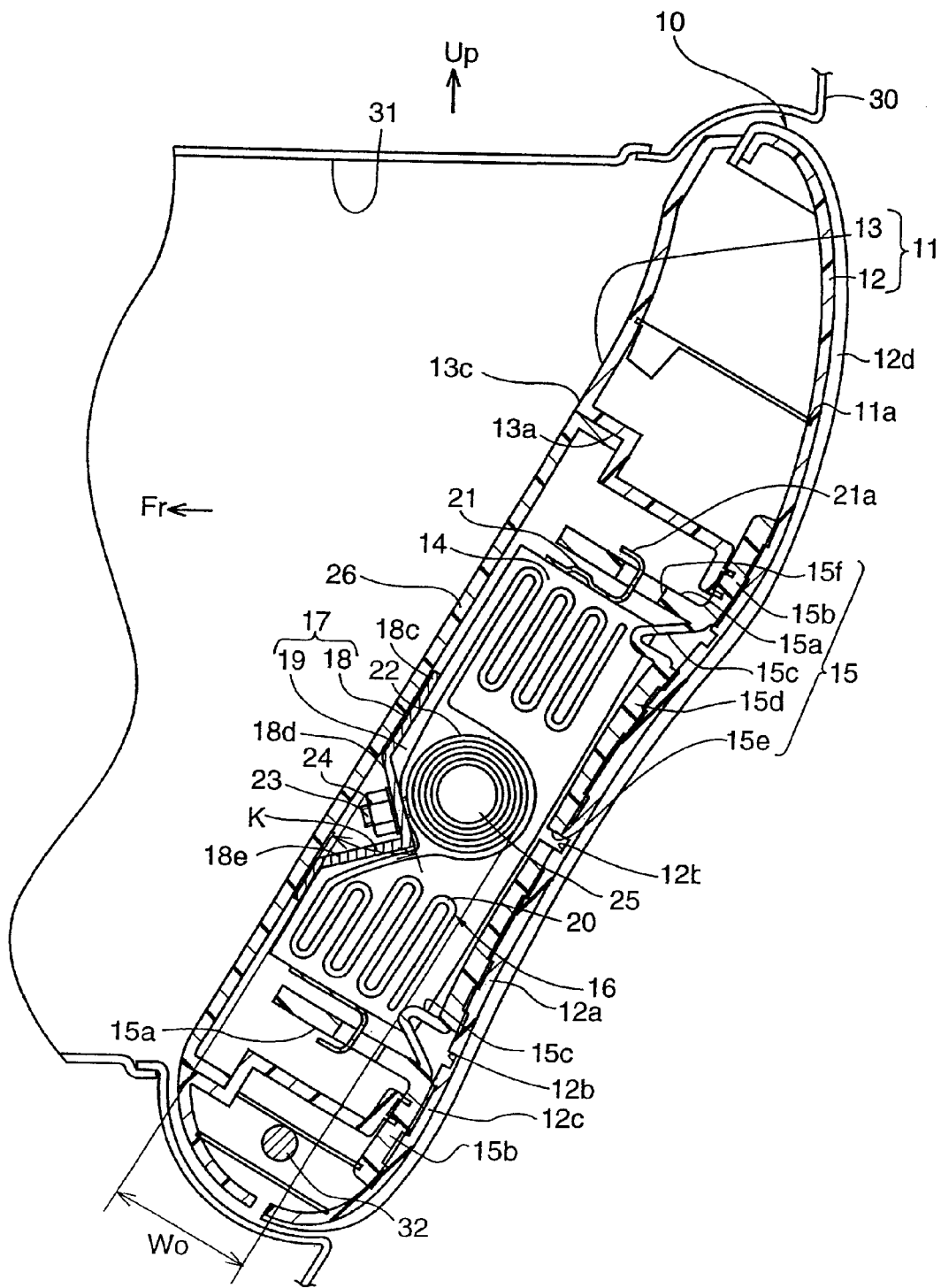
[FIG. 7]

[FIG. 8]
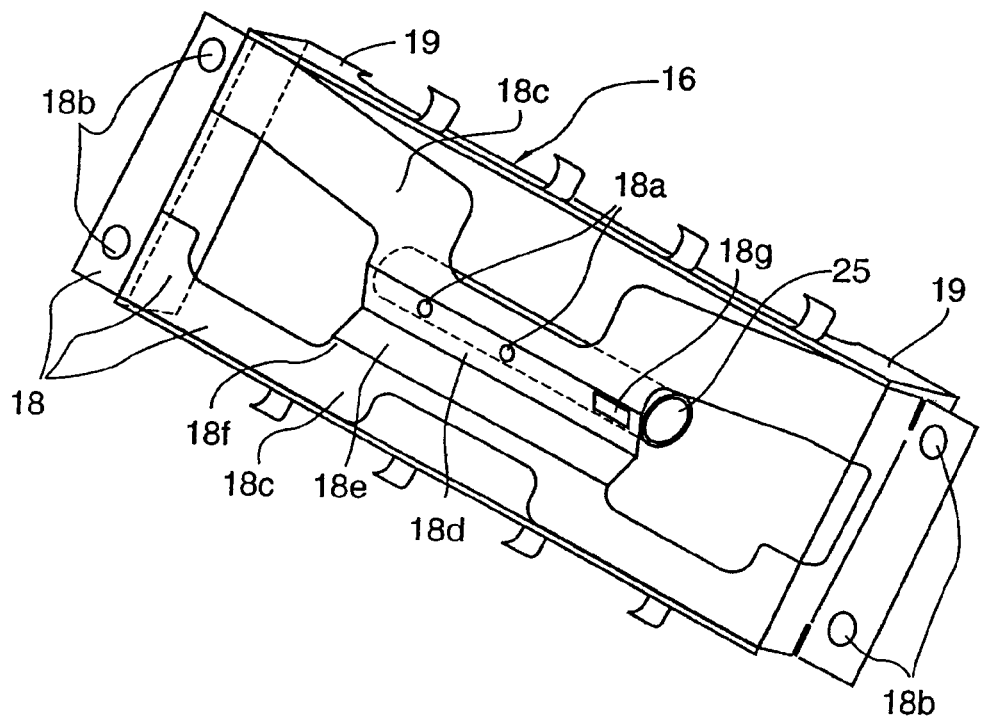
[FIG. 9]
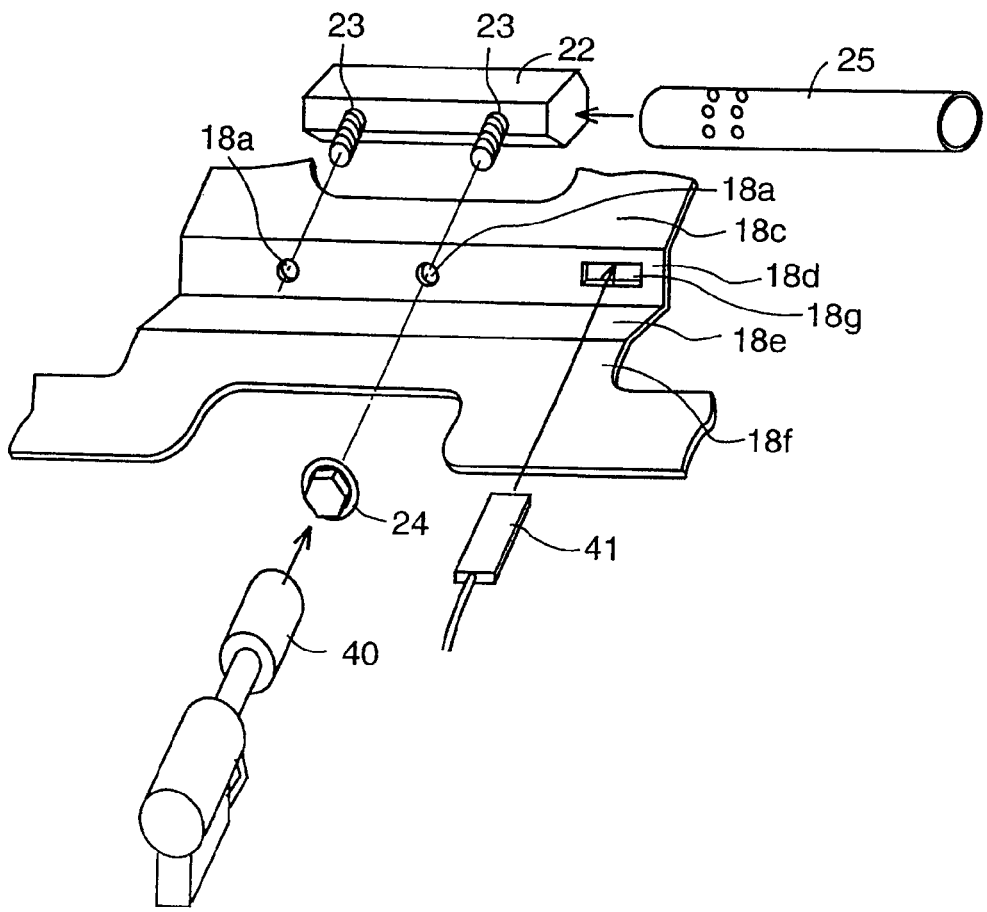

[FIG. 10]
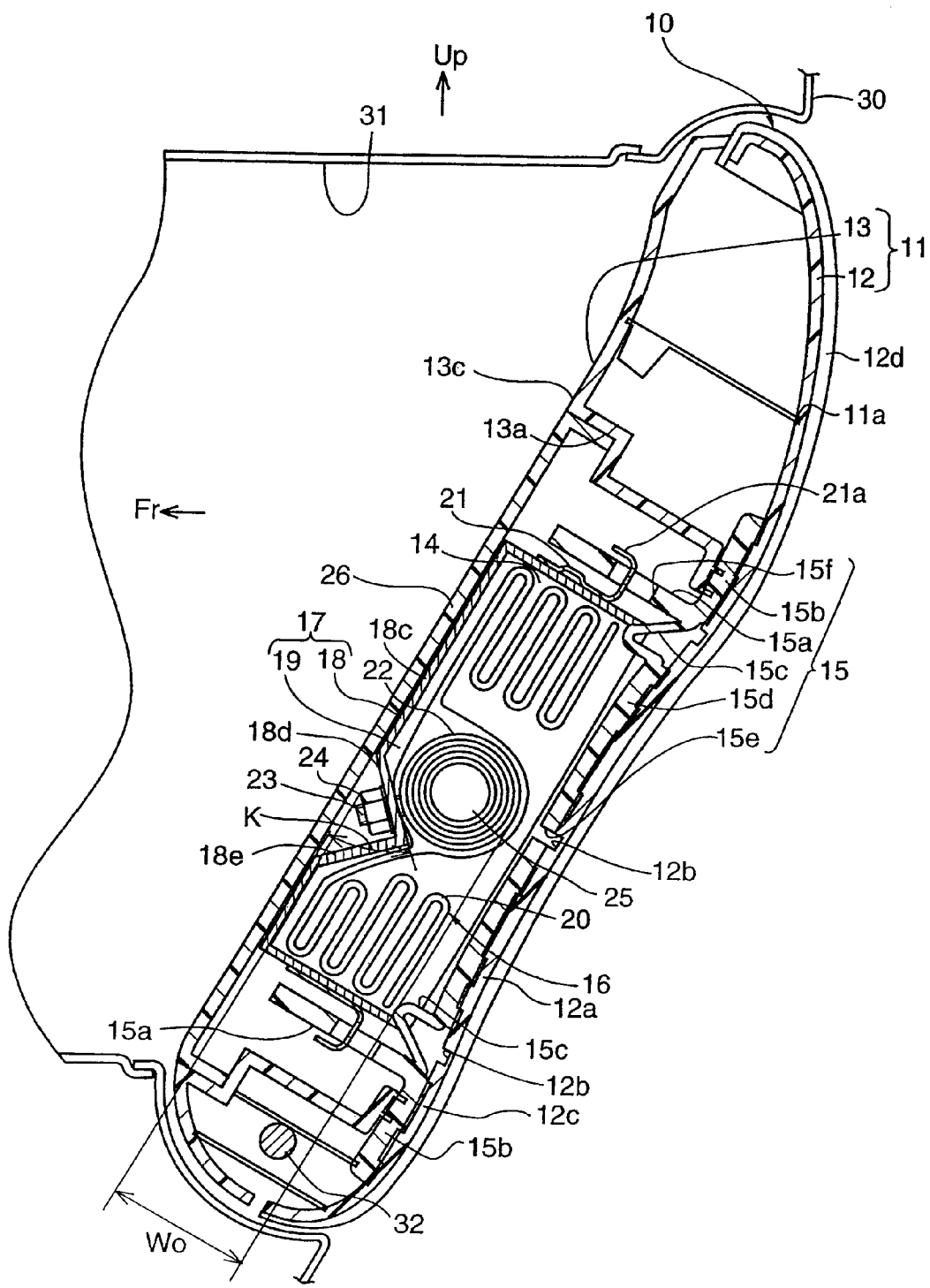

[FIG. 11]
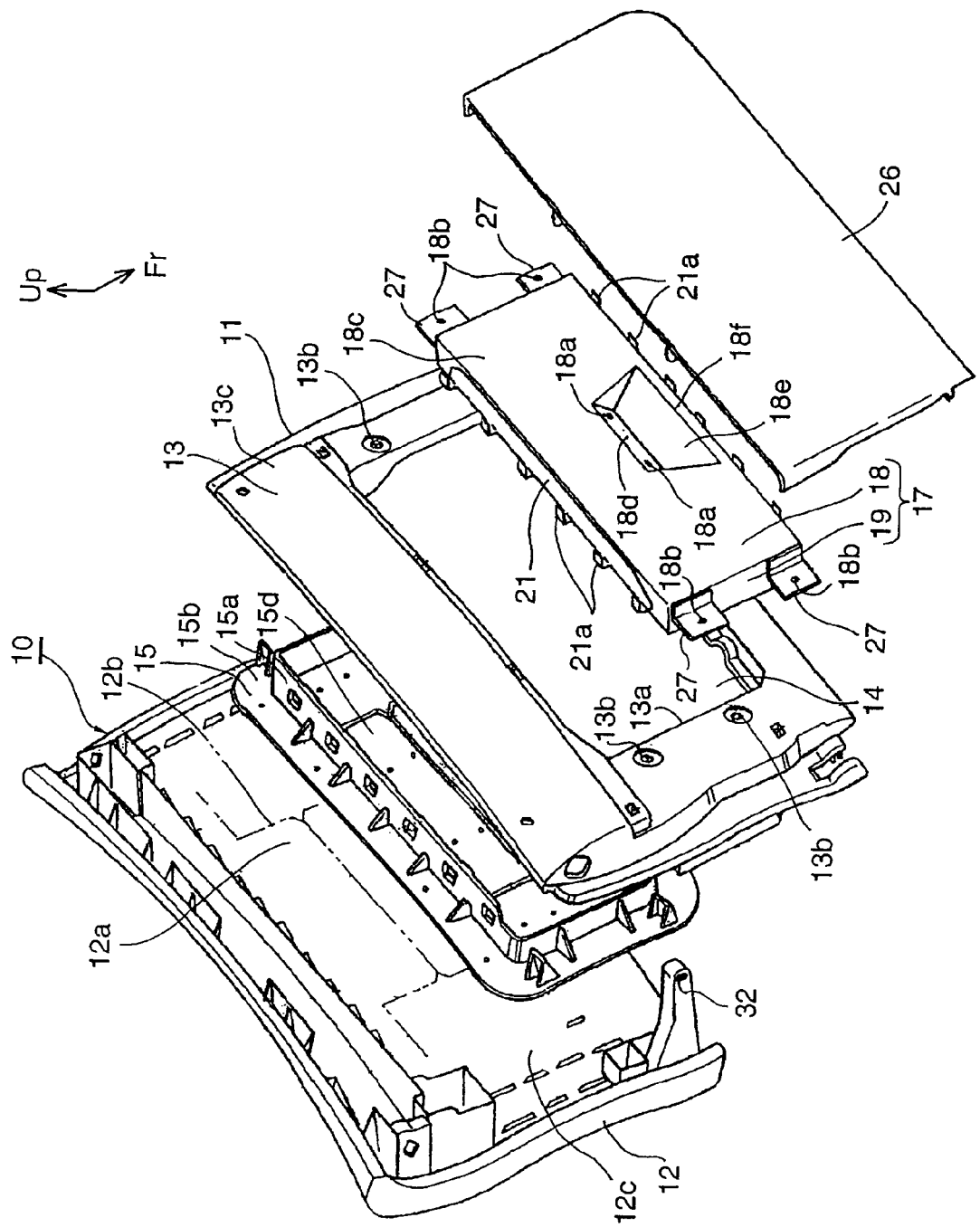

[FIG. 12]
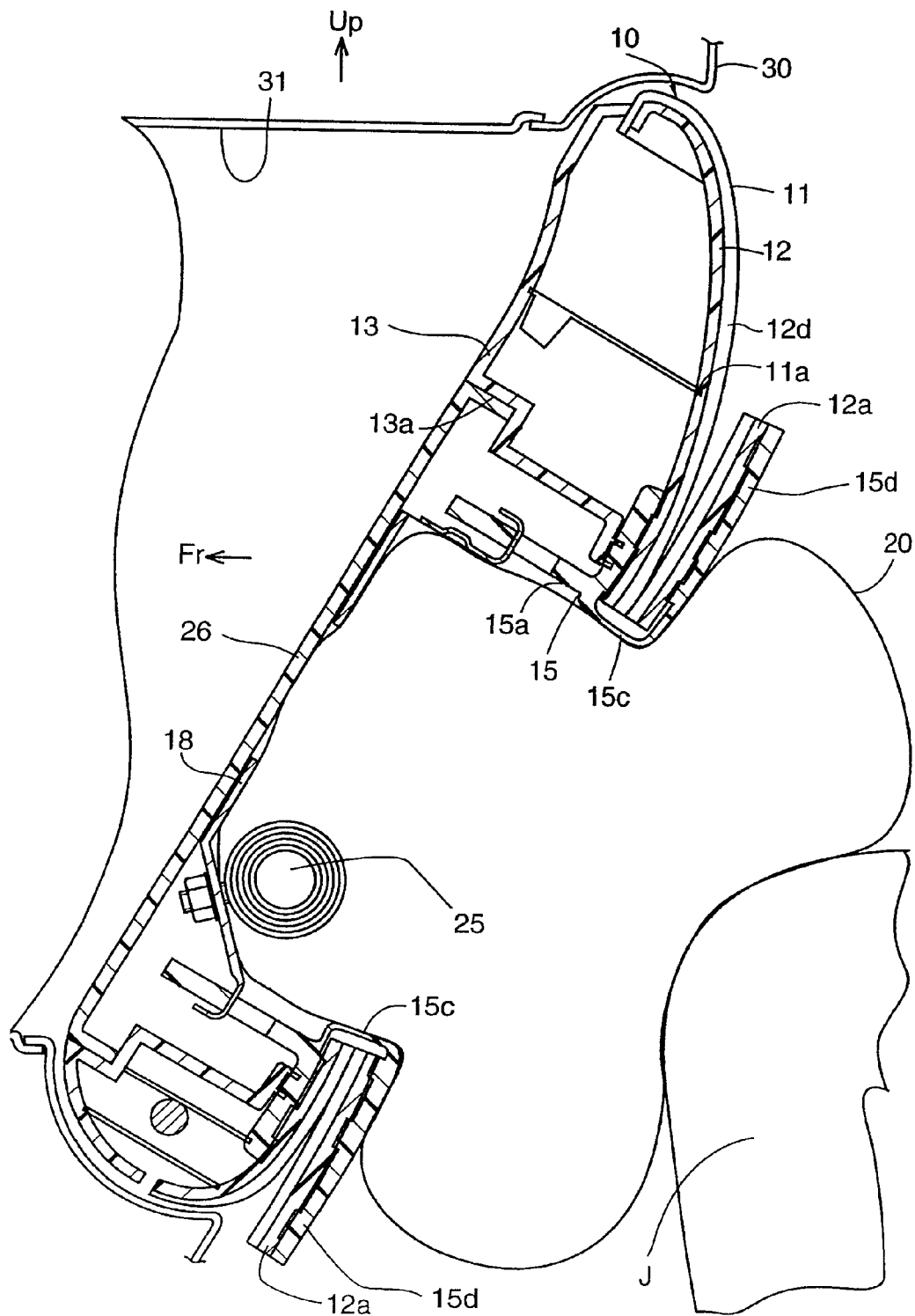

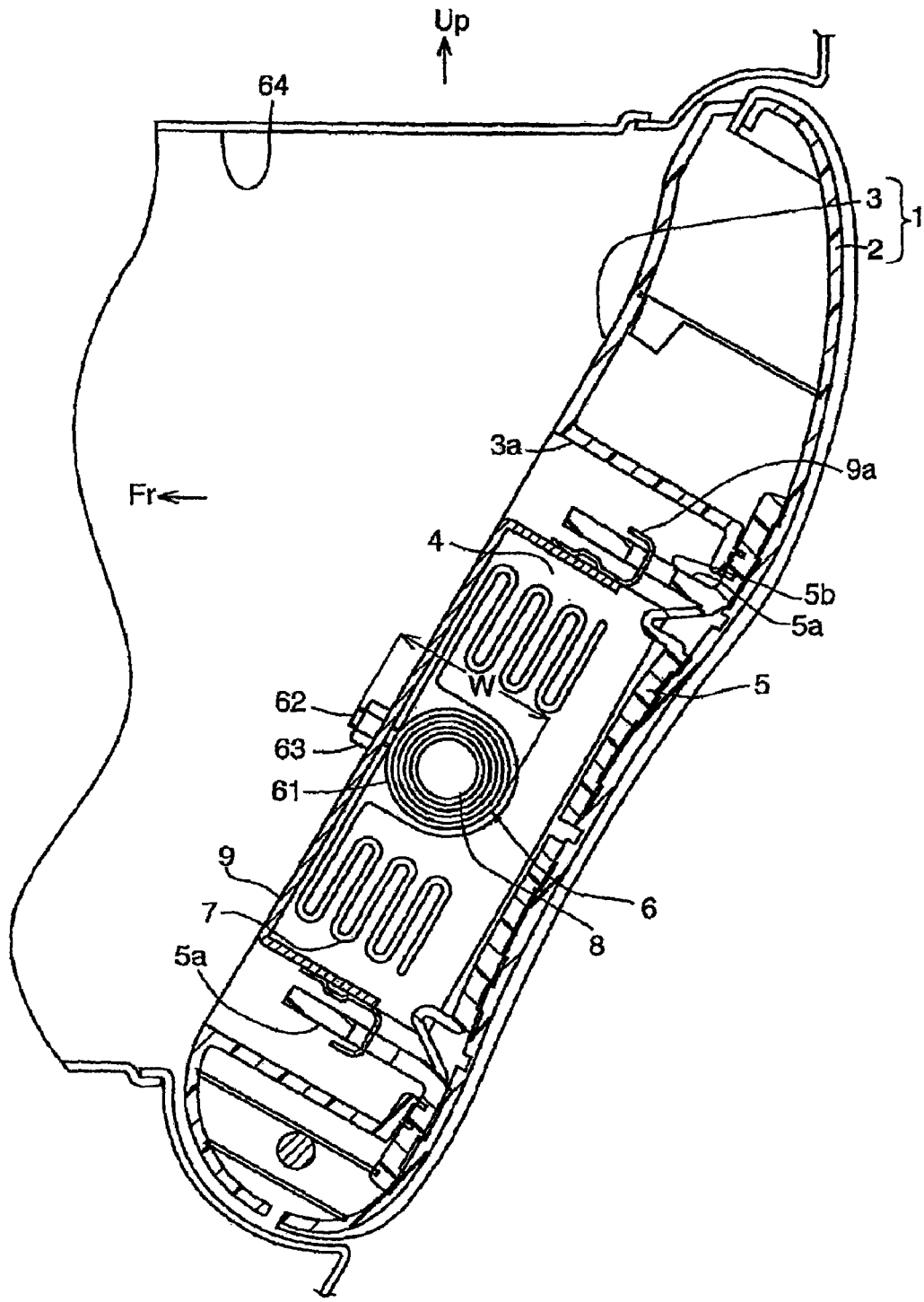
[FIG. 13]
RELATED ART

[FIG. 14]
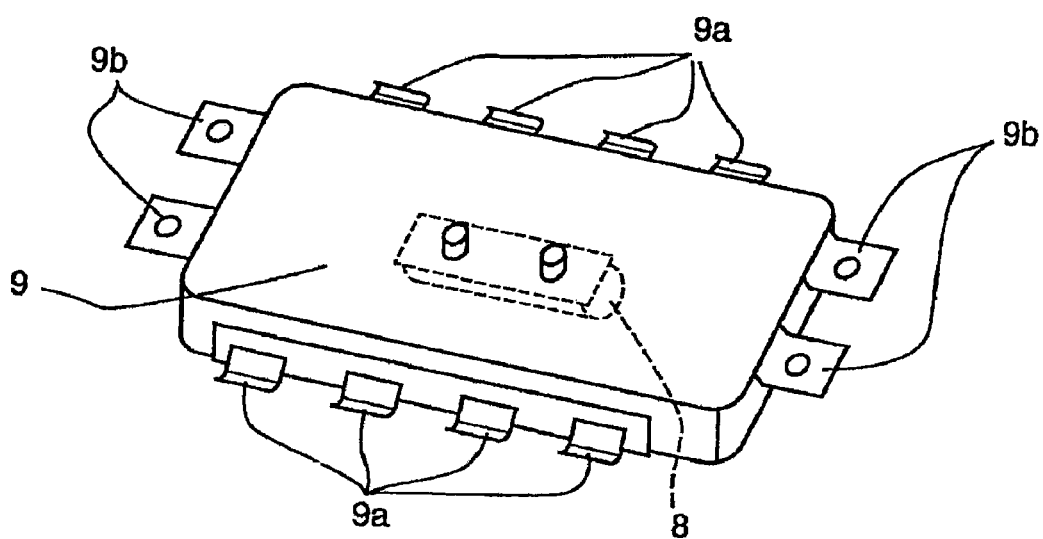
RELATED ART

GLOVE DOOR-INSTALLED KNEE AIR BAG APPARATUS

CROSS-REFERENCE TO RELATED APPLICATIONS

This application is a national phase application of International Application No. PCT/JP2008/070560, filed Nov. 12, 2008, and claims the priority of Japanese Application No. 2007-310728, filed Nov. 30, 2007, the contents of both of which are incorporated herein by reference.

TECHNICAL FIELD OF THE INVENTION

The present invention relates to a glove door-installed knee air bag apparatus installed to a glove door (a door of a glove box) located at a portion of an instrument panel of a vehicle in front of a passenger seat. The glove door-installed knee air bag apparatus has a knee air bag which, in the event of a frontal collision of the vehicle, tears or deforms a portion of the glove door to open the glove door and inflates toward an interior of the vehicle thereby restraining knees of an occupant of the vehicle.

BACKGROUND OF THE INVENTION

A glove door-installed knee air bag apparatus where a knee air bag module including a knee air bag and an inflator is housed in the glove door and, in the event of a frontal collision of the vehicle, the knee air bag inflates toward an interior of the vehicle and restrains knees of an occupant of the vehicle is known (for example, Patent Documents 1 and 2).
Patent Document 1: German Patent Application Laid-open 4209604
Patent Document 2: U.S. Pat. No. 6,276,713

With the glove door-installed knee air bag apparatuses of Patent Documents 1 and 2, there is a problem that because the knee air bag module has to be installed to the glove door in a manufacturing process of the glove door, it is difficult to make a manufacturing process of the glove door and a manufacturing process of the knee air bag module independent to each other.

BRIEF SUMMARY

Problems to be Addressed by Certain Embodiments of the Invention

In order to make it possible to install a knee air bag module, manufactured in a process different from a glove door manufacturing process, to a glove door, a plurality of structures for a glove door-installed knee air bag apparatus have been investigated. One of the structures is shown in FIGS. 13 and 14 (Japanese Patent Application 2007-306681). The glove door-installed knee air bag apparatus of FIGS. 13 and 14 is not a known structure and is applicable to the present invention except an inflator supporting member of the air bag module.

The glove door-installed knee air bag apparatus of FIGS. 13 and 14 includes a glove door 1, an air bag door 5 and an air bag module 6.

The glove door 1 has a glove door inner member 3 and a glove door outer member 2, and has an air bag module housing space 4 therein. The air bag door 5 is fixed to the glove door outer member 2 and has a rising wall 5a which rises around the air bag module housing space 4. An opening 3a is formed in the glove door inner member 3. The air bag module 6 which has been manufactured in a process different from manufacturing processes of the glove door 1 and the air bag door 5 can be inserted into the air bag module housing space 4 through the opening 3a to be assembled. The air bag module 6 comprises an air bag 7, an inflator 8 and an air bag casing 9 which operates as an inflator supporting member. The air bag casing 9 comprises a metal member which covers the inflator 8 and the air bag 7 from a back side of the glove door and supports the inflator 8 from the glove door and the air bag door.

The air bag casing 9 is supported by the glove door 1 and the air bag door 5, by engaging hook members 9a fixed to upper and lower end portions of the air bag casing 9 with apertures 5b formed in the rising wall 5a of the air bag door 5, and by securing fastening brackets 9b fixed to right and left end portions of the air bag casing 9 to the glove door inner member 3.

A stud bolt 62 extends from an inflator bracket 61 for holding the inflator 8 toward a glove box 64 in a direction perpendicular to (an extension of) a general plane of the glove door inner member 3, i.e., perpendicular to the air bag casing 9. The stud bolt 62 extends through the air bag casing 9 (a member corresponding to an inflator supporting member of the present invention). By engaging a nut 63 with the stud bolt 62 outside the air bag casing 9, the inflator 8 is fixed to and supported by the air bag casing 9.

In the event of a frontal collision of the vehicle, the inflator 8 is actuated and inflation gas is discharged from the inflator 8 into the air bag 7. The air bag 7 inflates and breaks a door portion of the air bag door 5 and a portion of the glove door outer member 2 (at grooved tear lines) to open them. The air bag 7 inflates toward an interior of the vehicle and restrains knees of the occupant.

However, there are the following problems with the glove door-installed knee air bag apparatus of FIGS. 13 and 14.
(i) Since the stud bolt 62 extends in the direction perpendicular to (the extension of) the general plane of the glove door inner member 3 and an end portion of the stud bolt 62 projects further than air bag casing 9 toward an interior of the glove box 64, a thickness (W) of the air bag module 6 measured at an inflator installing portion (a distance between a glove box-side end of the stud bolt 62 and an end, on the side opposite the stud bolt, of a configuration of the inflator 8) is increased. As a result, a volume of the glove box 64 is small by the increment of the thickness of the air bag module.
(ii) Actually, a synthetic resin cover (not shown in FIG. 3) will be installed to the glove door 3 at the opening 3a. Since the cover will be positioned closer to an interior of the glove box 64 than the glove box-side end of the stud bolt 62 so as not to interfere with the stud bolt 62, the volume of the glove box 64 further decreases.

An object of certain embodiments of the present invention is to provide a glove door-installed knee air bag apparatus wherein a knee air bag module made in a process different from a glove door manufacturing process can be installed to the glove door after the glove door has been manufactured and wherein a thickness of the air bag module measured at an inflator installing portion (a distance between a glove box-side end of a stud bolt and a stud bolt-opposite side end of a configuration of the inflator) is small (more particularly, smaller than that of apparatus of FIGS. 13 and 14).

Means for Solving the Problems

A glove door-installed knee air bag apparatus according to certain embodiments of the present invention to solve the above problems or to achieve the above object is as follows:

The following items (1)-(9) are applicable to all embodiments of the present invention:

(1) A glove door-installed knee air bag apparatus comprising:
- a glove door having a glove door inner member and a glove door outer member, the glove door inner member having a general plane, the glove door having an air bag module housing space therein;
- an air bag door fixed to the glove door outer member and having a rising wall rising around the air bag module housing space; and
- an air bag module including an inflator, an air bag and an inflator supporting member for supporting the inflator in the air bag module housing space,
- wherein the inflator supporting member includes an inflator installing portion where the inflator is fixed to the inflator supporting member, the inflator installing portion being inclined relative to the general plane of the glove door inner member in a vertical direction of the glove door, and wherein the inflator is fixed to the inflator supporting member at the inflator installing portion by a bolt extending in a direction perpendicular to the inflator installing portion.

(2) A glove door-installed knee air bag apparatus according to item (1) above, wherein the inflator supporting member includes a first portion which includes a portion parallel to the general plane of the glove door inner member and a second portion which includes a portion perpendicular to the general plane of the glove door inner member, the second portion being coupled to or formed integrally with the first portion, the inflator installing portion being formed at the first portion.

(3) A glove door-installed knee air bag apparatus according to item (1) or (2) above, wherein the bolt comprises a stud bolt, and wherein the inflator is fixed to the inflator installing portion of the inflator supporting member by the stud bolt which is fixed to an inflator installing bracket for holding the inflator and extends in the direction perpendicular to the inflator installing portion.

(4) A glove door-installed knee air bag apparatus according to any one of items (1)-(3) above, wherein the inflator installing portion of the inflator supporting member is inclined downwardly at an angle in a range of 30-60 degrees relative to the general plane of the glove door inner member.

(5) A glove door-installed knee air bag apparatus according to any one of items (1)-(4) above, wherein each of upper and lower end portions of the inflator supporting member engages the rising wall of the air bag door.

(6) A glove door-installed knee air bag apparatus according to any one of items (1)-(5) above, wherein a hook portion for causing the inflator supporting member to engage the rising wall of the air bag door is provided at each of upper and lower end portions of the inflator supporting member.

(7) A glove door-installed knee air bag apparatus according to any one of items (1)-(6) above, wherein the inflator supporting member is fixed to the glove door at each of right and left end portions of the inflator supporting member.

(8) A glove door-installed knee air bag apparatus according to any one of items (1)-(7) above, wherein the glove door inner member includes an opening formed therein in a frontward direction of the air bag module housing space, and a cover for covering the air bag module housing space, the bolt and the inflator supporting member from a front side thereof is coupled to the glove door inner member at the opening.

(9) A glove door-installed knee air bag apparatus according to any one of items (1)-(8) above, wherein a connector inserting aperture is formed in the inflator installing portion of the inflator supporting member.

The following item (10) is applied to first and second structural examples of a first embodiment of the present invention:

(10) A glove door-installed knee air bag apparatus according to any one of items (2)-(9), wherein the first portion of the inflator supporting member comprises a retainer and the second portion of the inflator supporting member comprises an air bag casing.

The following item (11) is applied to a second embodiment of the present invention:

(11) A glove door-installed knee air bag apparatus according to any one of items (2)-(9) above, wherein the first portion of the inflator supporting member comprises a bottom wall of an air bag casing and the second portion of the inflator supporting member comprises a side wall of the air bag casing.

The following item (12) is applied to the first structural example of the first embodiment of the present invention:

(12) A glove door-installed knee air bag apparatus according to item (10) above, wherein a center of the inflator fixed to the inflator installing portion of the inflator supporting member is offset in position from a center of the air bag module housing space in a vertical direction of the glove door.

The following item (13) is applied to the first structural example of the first embodiment of the present invention:

(13) A glove door-installed knee air bag apparatus according to item (10) or (12) above, wherein the inflator fixed to the inflator installing portion of the inflator supporting member is disposed at a lower end portion of the air bag module housing space.

The following item (14) is applied to the second structural example of the first embodiment of the present invention and the second embodiment of the present invention:

(14) A glove door-installed knee air bag apparatus according to item (10) or (11) above, wherein a center of the inflator fixed to the inflator installing portion of the inflator supporting member is located substantially at a center of the air bag module housing space in a vertical direction of the air bag module housing space.

The following item (15) is applied to the second structural example of the first embodiment of the present invention and the second embodiment of the present invention:

(15) A glove door-installed knee air bag apparatus according to item (14) above, wherein an impact wrench guide portion, substantially parallel to an axis of the bolt, bent from the inflator installing portion and extending in a vertical direction relative to the inflator installing portion is connected to the inflator installing portion of the inflator supporting member.

The following item (16) is applied to the second structural example of the first embodiment of the present invention and the second embodiment of the present invention:

(16) A glove door-installed knee air bag apparatus according to item (15) above, wherein an air bag restraining portion bent from the impact wrench guide portion and extending in a vertical direction relative to the impact wrench guide portion is connected to the impact wrench guide portion connected to the inflator installing portion of the inflator supporting member.

Technical Advantages

According to the glove door-installed knee air bag apparatus of item (1) above, a thickness of the air bag module at the inflator installing portion (a distance between a glove box-side end of the bolt or a nut screw-coupled to the bolt and a bolt-opposite side end of a configuration of the inflator) is smaller than that of the case of FIGS. 13 and 14, because the inflator supporting member includes the inflator installing portion where the inflator is fixed to the inflator supporting member, and the inflator installing portion is inclined relative to the general plane of the glove door inner member in the vertical of the glove door, and because the inflator is fixed to the inflator supporting member at the inflator installing portion by the bolt extending in the direction perpendicular to the inflator installing portion.

According to the glove door-installed knee air bag apparatus of item (2) above, the thickness of the air bag module at the inflator installing portion is smaller than that of a case where the bolt extends in a direction perpendicular to the general plane of the glove door inner member (the case of FIGS. 13 and 14), because the inflator supporting member includes the first portion which includes a portion parallel to the general plane of the glove door inner member and the second portion which includes a portion perpendicular to the general plane of the glove door inner member, and because the inflator installing portion is formed at the first portion and is inclined relative to the portion of the first portion parallel to the general plane of the glove door inner member.

According to the glove door-installed knee air bag apparatus of item (3) above, since the bolt comprises a stud bolt, and since the inflator is fixed to the inflator installing portion by the stud bolt which is fixed to the inflator installing bracket for holding the inflator, the thickness of the air bag module at the inflator installing portion, which is a distance between a glove box-side end of the stud bolt or a nut screw-coupled to the stud bolt and a stud bolt-opposite side end of a configuration of the inflator, is smaller than that of the case of FIGS. 13 and 14.

According to the glove door-installed knee air bag apparatus of item (4) above, since the inflator installing portion of the inflator supporting member is inclined by an angle in a range of 30-60 degrees relative to the general plane of the glove door inner member, the glove box-side end of the bolt or a nut screw-coupled to the bolt can be housed in a space positioned on a side closer to the glove door outer member than an extension of the portion of the inflator supporting member parallel to the general plane of the glove door inner member.

According to the glove door-installed knee air bag apparatus of any one of items (5) and (6) above, since the inflator supporting member engages the rising wall of the air bag door at each of the upper and lower end portions of the inflator supporting member, a portion of a reaction force of inflation of the air bag can be supported by the glove door outer member via the air bag door.

According to the glove door-installed knee air bag apparatus of item (7) above, since the inflator supporting member engages the glove door at each of the right and left end portions of the inflator supporting member, a portion of the reaction force of inflation of the air bag can be supported directly by the glove door.

According to the glove door-installed knee air bag apparatus of item (8) above, since the glove door inner member includes the opening formed therein in the frontward direction of the air bag module housing space, and the cover for covering the air bag module housing space, the bolt and the inflator supporting member from the front side thereof is fixed to a portion of the glove door inner member surrounding the opening, a convex or concave portion of the glove door inner member is removed from the glove door inner member. As a result, goods housed in the glove box are prevented from entering such convex or concave portion of the glove door inner member.

According to the glove door-installed knee air bag apparatus of item (9) above, since the connector inserting aperture is formed in the inflator installing portion of the inflator supporting member, it is easy to connect a connector to the inflator because the connector does not interfere with the inflator supporting member when coupled to the inflator.

According to the glove door-installed knee air bag apparatus of item (10) above, since the first portion of the inflator supporting member comprises the retainer and the second portion of the inflator supporting member comprises the air bag casing, the retainer can be constructed independently of the air bag casing. When the retainer is constructed independently of the air bag casing, it is easy to form the inclined inflator installing portion in the retainer.

According to the glove door-installed knee air bag apparatus of item (11) above, since the first portion of the inflator supporting member comprises a bottom wall of an air bag casing and the second portion of the inflator supporting member comprises a side wall of the air bag casing, the first portion and the second portion can be formed in a single air bag casing. As a result, the number of parts can be reduced compared with the case where the first portion and the second portion are constructed of separate parts.

According to the glove door-installed knee air bag apparatus of item (12) above, since the center of the inflator fixed to the inflator installing portion of the inflator supporting member is offset in position from the center of the air bag module housing space in the vertical direction of the glove door, a gravity center of the knee air bag apparatus can be displaced from the vertical center of the glove door apparatus, unlike the case where an inflator is placed at the vertical center of the air bag module housing space.

According to the glove door-installed knee air bag apparatus of item (13) above, since the inflator fixed to the inflator installing portion of the inflator supporting member is disposed at the lower end portion of the air bag module housing space, the gravity center of the knee air bag apparatus can be displaced downwardly from the central portion of the glove door apparatus, unlike the case where inflator is placed at the vertical center of the air bag module housing space. As a result, opening and closing handling of the glove door is light.

According to the glove door-installed knee air bag apparatus of item (14) above, since the center of the inflator fixed to the inflator installing portion of the inflator supporting member is located substantially at a center of the air bag module housing space in a vertical direction of the air bag module housing space, it is easy to dispose the impact wrench guide portion and an air bag restraining portion below the inflator installing portion of the inflator supporting member.

According to the glove door-installed knee air bag apparatus of item (15) above, since the impact wrench guide portion, substantially parallel to the bolt, bent from the inflator installing portion and extending in a vertical direction relative to the inflator installing portion is connected to the inflator installing portion of the inflator supporting member, the impact wrench guide portion can be easily formed in the inflator supporting member so that it is easy to screw-couple a nut to the bolt (for example, a stud bolt) using an impact wrench.

According to the glove door-installed knee air bag apparatus of item (16) above, since the air bag restraining portion bent from the impact wrench guide portion and extending in the up and down direction is connected to the impact wrench guide portion, it is possible to restrain the air bag by the air bag restraining portion when the air bag inflates and to prevent the air bag from inflating toward the glove box.

BRIEF DESCRIPTION OF THE DRAWINGS

Referring to the drawings, which form a part of this disclosure:

FIG. 1 is a cross-sectional view of an entire portion of a glove door-installed knee air bag apparatus according to a first structural example of a first embodiment of the present invention;

FIG. 2 is a schematic perspective view of a glove door inner member (viewed from a back side of the glove door) of the glove door-installed knee air bag apparatus of FIG. 1 (applicable also to a second structural example of the first embodiment of the present invention);

FIG. 3 is a schematic perspective view of a glove door outer member (viewed from the back side of the glove door) of the glove door-installed knee air bag apparatus of FIG. 1 (applicable also to the second structural example of the first embodiment of the present invention);

FIG. 4 is a schematic perspective view of an air bag door (viewed from the back side of the glove door) of the glove door-installed knee air bag apparatus of FIG. 1 (applicable also to the second structural example of the first embodiment of the present invention);

FIG. 5 is a schematic perspective view of an air bag module (viewed from the back side of the glove door) of the glove door-installed knee air bag apparatus of FIG. 1;

FIG. 6 is an enlarged cross-sectional view of the air bag module of FIG. 5;

FIG. 7 is a cross-sectional view of an entire portion of a glove door-installed knee air bag apparatus according to a second structural example of the first embodiment of the present invention;

FIG. 8 is a schematic perspective view of an air bag module (viewed from the back side of glove door) of the glove door-installed knee air bag apparatus of FIG. 7;

FIG. 9 is an enlarged perspective view of a portion of the air bag module of FIG. 8;

FIG. 10 is a cross-sectional view of an entire portion of a glove door-installed knee air bag apparatus according to a second embodiment of the present invention;

FIG. 11 is a schematic perspective view of the glove door-installed knee air bag apparatus according to the second embodiment of the present invention;

FIG. 12 is a cross-sectional view of the entire portion of the glove door-installed knee air bag apparatus of FIG. 1 when the air bag has inflated;

FIG. 13 is a schematic cross-sectional view of one example of a glove door-installed knee air bag apparatus (not known, and applicable also to the present invention except the air bag casing) investigated in development of an apparatus where a knee air bag module can be installed to a glove door after the glove door has been manufactured; and FIG. 14 is a schematic perspective view of the air bag module of the glove door-installed knee air bag apparatus of FIG. 13.

DETAILED DESCRIPTION

A glove door-installed knee air bag apparatus according to the present invention will be explained below with reference to FIGS. 1-12.

FIGS. 1-11 illustrate a glove door-installed knee air bag apparatus according to certain embodiments of the present invention before an air bag inflates, and FIG. 12 illustrates the glove door-installed knee air bag apparatus after the air bag has inflated.

FIGS. 1-9 illustrate a glove door-installed knee air bag apparatus according to a first embodiment of the present invention. In the first embodiment of the present invention, an inflator supporting member comprises a retainer and an air bag casing.

FIGS. 1-6 illustrate a structure (a first structural example) of the first embodiment of the present invention where an inflator installed to an inflator installing portion of the inflator supporting member is positioned at a lower end portion of an air bag module housing space in a vertical direction of the space.

FIGS. 7-9 illustrate a structure (a second structural example) of the first embodiment of the present invention where an inflator installed to an inflator installing portion of the inflator supporting member is positioned at a center of the air bag module housing space in the vertical direction of the space. FIGS. 2-4 are applicable to the apparatus of FIG. 1 and the apparatus of FIG. 7.

FIGS. 10 and 11 illustrate a glove door-installed knee air bag apparatus according to a second embodiment of the present invention. In the second embodiment of the present invention, an inflator supporting member comprises an air bag casing.

Portions common to all embodiments of the present invention are denoted with the same reference numerals throughout all embodiments of the present invention. In the drawings, arrow "Fr" shows a front direction of the glove door (a side closer to a glove box, i.e., a side opposite an interior of a vehicle) when the glove door is mounted to a vehicle, and arrow "Up" shows an upward direction of the glove door when the glove door is mounted to the vehicle.

Structures of the First Embodiment of the Present Invention

Including Structures Applicable to all Embodiments of the Present Invention

Structural Portions Applicable to all Embodiments, Among the Structures of the First Embodiment First, structures commonly applicable to all embodiments of the present invention among structures of the first embodiment of the present invention will be explained with reference to FIGS. 1-9 and FIG. 12. With respect to structures common to the first embodiment and the second embodiment, FIGS. 1-9 may be replaced by FIGS. 10 and 11, and FIGS. 10 and 11 may be referred to.

As illustrated in FIGS. 1-9, the glove door-installed knee air bag apparatus 10 according to the present invention includes a glove door 11 having an air bag module housing space (hereinafter, a housing space) 14 therein, an air bag door 15 and an air bag module 16. The air bag door 15 is vibration-welded to the glove door 11. The air bag module 16 is manufactured in a process different from the glove door manufacturing process. After the glove door 11 to which the air bag door 15 is welded has been manufactured, the air bag module 16 is installed into the housing space 14 of the glove door 11. After installing the air bag module 16 into the housing space 14, the housing space 14 is covered with a cover 26.

The glove door 11 is a door for a glove box 31 of a vehicle and is disposed at an instrument panel 30 in front of a passenger seat. The glove door 11 is disposed rotatably in a vertical direction about a rotational axis 32 located at a lower end portion of an opening of the glove box so as to open and close an interior of the glove box 31. The housing space 14 of the glove door 11 is located in front of knees of a male occupant when he is seated on the passenger seat. The rotational axis 32 may be located in a cross-section of the glove door 11 or may be located outside the cross-section of the glove door 11 by providing a bracket projecting outwardly from the glove door and locating the rotational axis at the bracket. The glove door 11 inclines toward the interior of the vehicle in the upward direction so as to match a configuration of a portion of the instrument panel 30 facing the interior of the vehicle when the glove door 11 is at a closing condition (in the condition of FIG. 1).

The glove door 11 includes a glove door outer member 12 facing the interior of the vehicle and a glove door inner member 13 located closer to the glove box 31 than the glove door outer member 12, i.e., on a side of the glove door outer member opposite the interior of the vehicle. The glove door 11 includes the housing space 14 in the glove door 11. The glove door inner member 13 has a general plane 13c facing the interior of the glove box 31 and defining a glove box-side surface of the glove door 11. In the glove door inner member 13, behind the housing space 14 when viewed from a vehicle occupant (in a frontward direction of the housing space 14 in a longitudinal direction of the vehicle), an opening 13a for releasing the housing space 14 open behind (toward the glove box 31) is formed. The air bag module 16 is inserted into the housing space 14 through the opening 13a and housed in the housing space.

After inserting the air bag module 16 into the housing space 14, the opening 13a of the glove door inner member 13 is covered with a synthetic resin cover 26. In a case where a retainer 18 and/or an air bag casing 19 which will be explained hereinafter can operate as a cover 26, the cover 26 does not need to be provided.

The glove door inner member 13 and the glove door outer member 12 are fixed to each other by welding or fastening at a tip of a rib 11a formed at either one of the glove door inner member 13 and the glove door outer member 12. In the embodiment shown in the drawing, the glove door inner member 13 and the glove door outer member 12 are fixed to each other by welding (vibration-welding). The glove door inner member 13 and the glove door outer member 12 are made from hard synthetic resin, and the hard synthetic resin is, for example, polypropylene (PP).

The air bag door 15 includes a general portion 15b and a rising wall 15a. The general portion 15b includes a rectangular portion located in a rearward direction of the housing portion 14 in the longitudinal direction of the vehicle and extending parallel to the glove door outer member 12. The rising wall 15a rises from the general portion 15b in a direction toward the glove door inner member 13 and rises perpendicularly to the general portion 15b.

The general portion 15b of the air bag door 15 has a door portion 15d (a portion of the general portion 15b) and a portion surrounding the door portion 15d. The door portion 15d is located in the rearward direction of the housing space 14 in the longitudinal direction of the vehicle and opens toward the interior of the vehicle in the event of a frontal collision of the vehicle. The door portion 15d is substantially rectangular and has an upper door portion opening upwardly and a lower door portion opening downwardly. The door portion 15d is separated or separable from the portion of the general portion 15b other than the door portion 15d (the portion of the general portion 15b surrounding the door portion 15d) by a slit 15e having the form of alphabet letter H. Between the door portion 15d and the rising wall 15a, at upper and lower sides of the housing space 14 extending in a right and left direction, integral hinges 15c are formed in the air bag door 15 integrally with the air bag door. In the event of a frontal collision of the vehicle, the door portion 15d is pushed by the inflating air bag and opens toward the interior of the vehicle by rotating about the integral hinges 15c, accompanied by an elastic deformation of the integral hinges 15c. Hook engaging holes 15f where hook portions of a hook member, which will be explained hereinafter, engage are formed in the rising wall 15a.

The general portion 15b and the door portion 15d are welded to the glove door outer member 12.

The air bag door 15 is made from flexible synthetic resin more flexible than the hard synthetic resin (for example, polypropylene (PP)) which is a material for the glove door inner member 13 and the glove door outer member 12. The flexible synthetic resin comprises, for example, olefin elastomer (TPO, i.e., thermo plastic elastomer usually produced by dispersing ethylene-propylene rubber in PP). At an ordinary ambient temperature and at lower temperatures, the olefin elastomer maintains to be an elastomer (to be elastic). As a result, even at very low temperatures (for example, at −30° C.) the integral hinge 15c can be elastically deformed so that the door portion 15d can open. Since both TPO of the air bag door 15 and PP of the glove door inner member 13 and the glove door outer member 12 are olefin, the air bag door 15 made from TPO can be welded to the glove door inner member 13 and the glove door outer member 12.

In order that a portion 12a of the glove door outer member 12 facing the door portion 15d of the air bag door 15 can open together with the door portion 15d of the air bag door 15 when the door portion 15d of the air bag door 15 opens in the event of a frontal collision of the vehicle, a tearably worked portion 12b (a rectangular tear line surrounding the portion 12a facing the door portion 15d) is formed at a circumference of the portion 12a. The tear line 12b comprises, for example, a continuously extending notch (a portion worked thin). The portion 12a is separated from a remaining portion 12c (a portion other than the portion 12a) of the glove door outer member 12 at the tear line 12b so that the portion 12a can rotate about the integral hinge 15c to open together with the door portion 15d of the air bag door 15 welded to the portion 12a. A layer 12d is a surface layer of the glove door outer member 12.

The air bag module 16 includes an inflator 25, an air bag (a knee air bag) 20 and an inflator supporting member 17 which supports the inflator 25 in the housing space 14 from the glove door and/or the air bag door. The inflator supporting member 17 is made from metal or synthetic resin.

The inflator supporting member 17 includes an inflator installing portion 18d where the inflator 25 is coupled to the inflator supporting member. The inflator installing portion 18d is inclined in an up and down direction of the glove door relative to the general plane 13c (which may include an extension of the general plane 13c) of the glove door inner member 13 by an angle K which is in the range of 30-60 degrees. The angle K is an angle in the range of 30-60 degrees, for preventing a tip of the stud bolt 23 from extending more outwardly from a configuration of the glove door than an extension of the general plane (a portion parallel to the general plane 13c of the glove door inner member 13) 18c of a first portion (which will be explained hereinafter) 18 of the inflator supporting member 17. More preferably, the angle K is an angle in the range of 40-50 degrees, and much more preferably, the angle K is 45 degrees.

The inflator 25 is fixed to the inflator supporting member 17 at the inflator installing portion 18d by the bolt 23 extending perpendicular to the inflator installing portion 18d. The bolt 23 comprises a stud bolt (hereinafter, explanation will be made by a stud bolt, but the bolt is not limited to a stud bolt).

More particularly, the inflator 25 is fixed to the inflator supporting member 17 at the inflator installing portion 18d by the stud bolt 23 which is fixed to an inflator support bracket 22 holding the inflator 25 and extends in the direction perpendicular to the inflator installing portion 18d. The inflator 25 is fixed to the inflator installing portion 18d by inserting the stud bolt 23 through a bolt hole 18a formed in the inflator installing portion 18d and screw-coupling a nut 24 with the stud bolt 23.

The inflator supporting member 17 includes a first portion 18 which includes a portion parallel to the general plane 13c of the glove door inner member 13 and a second portion 19 which includes a portion perpendicular to the general plane 13c of the glove door inner member 13. The second portion 19 is made separately from the first portion 18 and is coupled (fixed) to the first portion 18, or is formed integrally with the first portion 18. In the case where the second portion 19 and the first portion 18 are integral to each other, the second portion 19 and the first portion 18 construct a single member. The inflator installing portion 18d is formed at the first portion 18.

The inflator supporting member 17 engages the rising wall 15a of the air bag door 15 at each of upper and lower end portions of the inflator supporting member 17. A hook portion 21a for causing the inflator supporting member 17 to engage the rising wall 15a of the air bag door 15 is provided at each of the upper and lower end portions of the inflator supporting member 17. The hook portion 21a may be constructed by forming the hook portion in a hook member 21 which is a member separate from the inflator supporting member 17 and fixing the hook member 21 to the upper and lower portions of the inflator supporting member 17, or by forming the hook portion 21a integrally with the inflator supporting member 17 at the upper and lower portions of the inflator supporting member 17.

The inflator supporting member 17 is coupled to the glove door 11 (for example, to the glove door inner member 13) at each of right and left end portions of the inflator supporting member 17. Threaded holes 13b are formed in the glove door inner member 13. The inflator supporting member 17 is coupled to the glove door 11 (for example, to the glove door inner member 13) by causing bolts to penetrate bolt holes 18b formed in right and left end portions of the inflator supporting member 17 and screw-coupling the bolts to the threaded holes 13b.

At the inflator installing portion 18d, a connector inserting aperture 18g used when connecting a connector to the inflator 25 is formed. Coupling the connector 41 to the inflator 25 is conducted by inserting the connector to the inflator through the connector inserting aperture 18g.

At the opening 13a of the glove door inner member 13, a cover 26 for covering the housing space 14, the bolt (stud bolt) 23 and the inflator supporting member 17 from a front side thereof is installed. The cover 26 is made from synthetic resin or metal. The bolt (stud bolt) 23 is located closer to the housing space 14 than the cover.

The above-described structures are applicable to all of the embodiments of the present invention.

Structures Unique to the First Embodiment of the Present Invention

Next, structures unique to the first embodiment of the present invention will be explained with reference to FIGS. 1-9.

In the first embodiment of the present invention, the first portion 18 of the inflator supporting member 17 comprises a retainer (denoted with the same reference as the first portion), and the second portion 19 comprises an air bag casing (denoted with the same reference as the second portion). The retainer 18 and the air bag casing 19 may be formed integrally with each other in a single member or may be formed separately from each other in separate members and coupled to each other.

The retainer 18 bridges the opening 13a of the glove door inner member 13 in a right and left direction of the opening. The retainer 18 is fastened to the glove door inner member 13 of the glove door 18 at the threaded holes 13b (FIG. 2) by bolts which extend through the bolt holes 18b formed in right and left end portions of the retainer 18 (FIGS. 5 and 8). The retainer 18 and/or the air bag casing 19 engage the rising wall 15a of the air bag door 15 at the hook portions 21a.

The retainer 18 includes the general plane 18c parallel to the general plane of the glove door inner member 13. The inflator installing portion 18d is inclined relative to the general plane 18c of the retainer 18 by an angle K in a vertical direction of the glove door. In the embodiment shown, the inflator installing portion 18d is connected to a lower end portion of the retainer general plane 18c and is inclined relative to the retainer general plane 18c in a down direction. Otherwise, the inflator installing portion 18d may be connected to an upper end portion of the retainer general plane 18c and may be inclined relative to the retainer general plane 18c in a down direction.

The first embodiment of the present invention includes a glove door-installed knee air bag apparatus 10 having a structure (a first structural example) shown in FIGS. 1, 5 and 6, and a glove door-installed knee air bag apparatus 10 having a structure (a second structural example) shown in FIGS. 7, 8 and 9. The above-described structures of the retainer 18 of the first embodiment are applicable to both the first structural example and the second structural example.

Structures Unique to the First Structural Example of the First Embodiment of the Present Invention In the first structural example, as illustrated in FIGS. 1, 5 and 6, a center of the inflator 25 is offset in position from a vertical center of the housing space 14 in a vertical direction of the glove door. For example, the inflator 25 is disposed at a lower portion of the housing space 14.

In the first structural example, the retainer 18 includes a portion 18h which is bent relative to the inflator installing portion 18d and extends substantially parallel to the rising wall 15a of the air bag door 15. At the portion 18h, the hook portion 21a on the lower side of the inflator supporting member 17 is formed integrally to the retainer 18. In the structure of FIGS. 1, 5 and 6, the hook portion 21a on the upper side of the inflator supporting member 17 is formed in the air bag casing 19.

Structures Unique to the Second Structural Example of the First Embodiment of the Present Invention And Applicable Also to the Second Embodiment of the Present Invention In the second structural example, as illustrated in FIGS. 7, 8 and 9, a center of the inflator 25 is located substantially at a vertical center of the housing space 14. The hook portion 21a is formed in the air bag casing 19 at the upper and lower end portions of the inflator supporting member 17. The hook portion 21a may be manufactured separately from the air bag casing 19 and fixed to the air bag casing 19.

In the second structural example, an impact wrench guide portion (an impacter seat surface portion) 18e, substantially parallel to an axis of the bolt 23, bent from the inflator installing portion 18d and extending in the vertical direction relative to the inflator installing portion 18d is connected to the inflator installing portion 18d of the inflator supporting member 18. The impact wrench guide portion 18e guides an impact wrench (an impacter, an air tool) when screw-coupling a nut 24 to the bolt 23. An angle defined between the impact wrench guide portion 18e and the inflator installing portion 18d is a right angle.

In the second structural example, an air bag restraining portion 18f bent from the impact wrench guide portion 18e and extending in a vertical direction relative to the impact wrench guide portion 18e is connected to the impact wrench guide portion 18e which is connected to the inflator installing portion 18d of the retainer 18. The air bag restraining portion 18f is located in an extension of the general plane 18c of the retainer 10 and is parallel to the general plane 18c of the retainer 10. The air bag restraining portion 18f operates so as to prevent the air bag from inflating toward the glove door inner member.

The above-described structures unique to the second structural example of the first embodiment are applicable also to the second embodiment of the present invention except that in the second embodiment, the retainer 18 should be read as an air bag casing bottom wall portion 18.

Effects and Technical Advantages of the First
Embodiment, Including Effects and Technical
Advantages Applicable to all Embodiments Effects and Technical Advantages Applicable to all
Embodiments Among the Effects and Technical
Advantages of the First Embodiment First, effects and technical advantages applicable to all embodiments of the present invention among the effects and technical advantages of the first embodiment of the present invention will be explained.

As illustrated in FIG. 12, in the event of frontal collision of a vehicle, the air bag 20 inflates toward the interior of the vehicle and restrains knees of the occupant from a front side thereof. In a conventional knee air bag apparatus where a knee air bag is installed at an instrument panel portion located below a glove door, the inflating knee air bag inflates toward shins of the occupant to restrain the shins of the occupant firstly and then further inflates upwards to restrain knees of the occupant. As a result, it is difficult to restrain the knees swiftly. In contrast, in the glove door-installed knee air bag apparatus 10 according to the present invention, since the knee air bag 20 directly restrains the knees of the occupant, the knee air bag 20 can restrain the knees of the occupant more swiftly than the conventional knee air bag.

Since the opening 13a is formed at the portion of the glove door inner member 13 behind the housing space 14 (in front of the housing space in the frontward and rearward directions of the vehicle) and the air bag module 16 is inserted into the housing space 14 through the opening 13a and housed in the housing space, even after the glove door inner member 13, the glove door outer member 12 and the air bag door 15 have been welded to each other whereby the assembly of the glove door 11 and the air bag door 15 is manufactured, the air bag module 16 can be installed to the assembly of the glove door 11 and the air bag door 15. As a result, a manufacturing process of the glove door 11 and a manufacturing process or the air bag module 16 can be made independent of each other, and the glove door 11 and the air bag module 16 can be manufactured by different parts makers. This increases a freedom of the manufacturing processes of the parts.

In the case where the opening 13a is formed in the glove door inner member 13, a rigidity and a strength of the glove door 11 will decrease as compared with a case where the opening 13a is not formed. In order to suppress a decrease in the rigidity and the strength of the glove door 11, as illustrated in FIGS. 13 and 14, it will be effective to cover the opening of the glove door inner member 3 with an air bag casing 9 made from metal, to cause hook members 9a fixed to upper and lower end portions of the casing 9 to engage with holes formed in a rising wall 5a of an air bag door 5, and to fasten fastening brackets 9b fixed to right and left end portions of the air bag casing 9 to the glove door inner member 3.

In the case of FIGS. 13 and 14, an inflator installing stud bolt 62 extends in a direction perpendicular to a general plane of the air bag casing 9 and extends through the general plane of the air bag casing 9 toward the glove box 64. The inflator installing stud bolt 62 is fixed to the general plane of the air bag casing 9 by screw-coupling a nut 63 to the stud bolt 62.

However, with the structure of FIGS. 13 and 14, there is a problem that a thickness W of the air bag module measured at an installing portion of the inflator 8 to the air bag casing 9 is large and by the increment of the thickness, a volume of a glove door box 64 becomes small.

In contrast, in the structures of the first embodiment of the present invention illustrated in FIGS. 1-9 and 12, the inflator supporting member 17 includes the inflator installing portion 18d where the inflator 25 is fixed to the inflator supporting member, and the inflator installing portion 18d is inclined relative to the general plane 13c of the glove door inner member 13 in the vertical direction of the glove door. Further, the inflator 25 is fixed to the inflator installing portion 18d by the bolt (for example, the stud bolt) 23 extending in the direction perpendicular to the inflator installing portion 18d. As a result, the thickness of the air bag module 16 measured at the inflator installing portion (a distance W0, shown in FIGS. 1 and 7, measured in the direction perpendicular to the general plane 18c of the first portion 18, between (a) a glove box-side projecting end of the stud bolt 23 or the nut 24 screw-coupled to the stud bolt and (b) a stud bolt-opposite side end of a configuration of the inflator 25) is smaller than a corresponding distance W in the case of FIGS. 13 and 14. Accordingly, the volume of the interior of the glove box 31 increases by a difference (W−W0).

Since the inflator supporting member 17 includes the first portion 18 which includes a portion parallel to the general plane 13c of the glove door inner member 13 and the second portion 19 which includes a portion perpendicular to the general plane 13c of the glove door inner member 13, and since the inflator installing portion 18d is formed at the first portion 18 and is inclined relative to the portion of the first portion 18 parallel to the general plane 13c of the glove door inner member 13, the thickness of the air bag module 16 measured at the inflator installing portion 18d is smaller than the corresponding thickness in the case (of FIGS. 13 and 14) where the bolt extends in a direction perpendicular to the general plane of the glove door inner member.

Since the inflator 25 is fixed to the inflator installing portion 18d by the stud bolt 23, the thickness of the air bag module 16 measured at the inflator installing portion 18d, which is a distance between a glove box-side projecting end of the stud bolt 23 or the nut 24 screw-coupled to the stud bolt and a stud bolt-opposite side end of a configuration of the inflator 25, is smaller than the corresponding thickness in the case of FIGS. 13 and 14, Since the inflator installing portion 18d is inclined by an angle in the range of 30-60 degrees relative to the general plane 13c of the glove door inner member 13, the glove box-side projecting end of the stud bolt 23 or the nut 24 screw-coupled to the stud bolt 23 can be positioned on a side closer to the glove door outer member 12 than an extension of the portion of the inflator supporting member 17 parallel to the general plane 13c of the glove door inner member 13.

Since the inflator supporting member 17 is coupled to the rising wall 15a of the air bag door 15 at each of the upper and lower end portions of the inflator supporting member 17, a portion of a reaction force of inflation of the air bag can be supported by the glove door outer member 12 via the air bag door 15.

Since the inflator supporting member 17 is coupled to the glove door 11 at each of the right and left end portions of the inflator supporting member 17, a portion of the reaction force of inflation of the air bag can be supported directly by the glove door 11.

Since the glove door inner member 13 includes the opening 13a formed in front of the air bag module housing space 14, and the cover 26 for covering the air bag module housing space 14, the bolt 23 and the inflator supporting member 17 from the front side thereof is fixed to the portion of the glove door inner member 13 surrounding the opening 13a, a convex or concave portion does not appear in the front surface of the glove door inner member 13. As a result, goods housed in the glove box 31 are prevented from entering such convex or concave portion of the glove door inner member 13.

The above-described effects and technical advantages are commonly applicable to all embodiments of the present invention.

Effects and Technical Advantages Unique to the First Embodiment

Next, effects and technical advantages unique to the first embodiment of the present invention will be explained.

In the first embodiment of the present invention, since the first portion 18 of the inflator supporting member 17 comprises the retainer 18 and the second portion 19 of the inflator supporting member 17 comprises the air bag casing 19, the retainer 18 can be constructed separately from the air bag casing 19 (but, may be constructed integrally with the air bag casing). When the retainer 18 is constructed separately from the air bag casing 19, it is easy to form the inclined inflator installing portion 18d in the retainer 18.

Further, since the connector inserting aperture 18g for inserting the connector to the inflator 25 through the aperture is formed in the inflator installing portion 18d of the first portion 18 of the inflator supporting member 17, it is easy to connect the connector 41 to the inflator 25.

Effects and Technical Advantages Unique to the First Structural Example of the First Embodiment In the first structural example of the first embodiment of the present invention, since the center of the inflator 25 fixed to the inflator installing portion 18d is offset in position from the vertical center of the housing space 14 in the vertical direction of the glove door, the gravity center of the knee air bag apparatus 10 can be displaced from the vertical center of the glove door apparatus 10, unlike the case where the inflator 25 is placed at the vertical center of the housing space 14.

Further, in the case where the inflator 25 is disposed at the lower end portion of the housing space 14, the gravity center of the knee air bag apparatus 10 can be shifted downwardly from the central portion of the glove door apparatus, unlike the case where the inflator 25 is placed at the vertical center of the housing space 14. As a result, handling of the glove door 11 for opening and closing the glove door is light.

Further, in the structures of FIG. 1, since the hook portions 21a of the lower end portion of the retainer 18 is formed integrally with the retainer 18, the number of parts is reduced and the cost is decreased, as compared with a case where the retainer 18 or the air bag casing 19, and the hook portions 21a provided at the lower end portion of the retainer 18 are constructed of separate parts.

Effects and Technical Advantages Unique to the Second Structural Example of the First Embodiment

And Also Applicable to the Second Embodiment

In the second structural example of the first embodiment of the present invention, since the center of the inflator 25 fixed to the inflator installing portion 18d is located substantially at the vertical center of the housing space 14, it is easy to dispose the impact wrench guide portion 18e and the air bag restraining portion 18f below the inflator installing portion 18d of the inflator supporting member 17.

In the case where the impact wrench guide portion 18e bent from the inflator installing portion 18d and extending in a vertical direction relative to the inflator installing portion 18d is connected to the inflator installing portion 18d of the inflator supporting member 17, since the impact wrench guide portion 18e guides the impacter 40 when screw-coupling the nut 24 to the stud bolt 23 by using the impacter 40, it is easy to screw-couple the nut 24 to the bolt.

Further, in the case where the air bag restraining portion 18f bent from the impact wrench guide portion 18e and extending in the vertical direction relative to the impact wrench guide portion 18e is connected to the impact wrench guide portion 18e, the air bag restraining portion 18f can prevent the air bag 20 from inflating toward the glove box 31. As a result, the air bag 20 can swiftly inflate toward the knees of the occupant J and restrain the knees of the occupant J.

Structures Unique to the Second Embodiment of the Present Invention

The structures commonly applicable to all embodiments of the present invention among the afore-described structures of the first embodiment of the present invention are also applicable to the second embodiment of the present invention. Hereinafter, only structures unique to the second embodiment of the present invention will be explained.

In the second embodiment of the present invention, as illustrated in FIGS. 10 and 11, the inflator supporting member 17 comprises an air bag casing 17 (denoted with the same reference numeral as that of the inflator supporting member, because the air bag casing is the inflator supporting member) made from metal or synthetic resin. The first portion 18 of the inflator supporting member 17 comprises a bottom wall 18 (denoted with the same reference numeral as that of the first portion, because the bottom wall is the first portion) of the air bag casing, and the second portion 19 of the inflator supporting member 17 comprises a side wall 19 (denoted with the same reference numeral as that of the second portion, because the side wall is the second portion) of the air bag casing 17. The bottom wall 18 of the air bag casing 17 and the side wall 19 of the air bag casing 17 are integral with each other.

The inflator installing portion 18d is integrally formed in the bottom wall portion 18 of the air bag casing 17. The inflator installing portion 18*d* is inclined by an angle K in a vertical direction relative to the general plane 13*a* of the glove door inner member 13 and relative to the bottom wall 18 of the air bag casing 17. The inflator installing bracket 22 for holding the inflator 25 is installed to and fixed to the inflator installing portion 18*d* by the stud bolt 23 and the nut 24. The tip ends of the stud bolt 23 and the nut 24 are located closer to the glove door outer member 12 than the extension of the general plane 18*c* of the bottom wall portion 18 of the air bag casing 17.

The hook members 21 where the hook portions 21*a* are formed are coupled to or integrally formed in the side walls 19 of the upper and lower end portions of the air bag casing 17. The air bag casing 17 is supported by the rising wall 15*a* of the air bag door 15 at the hook portions 21*a*. A bracket 27 (which may be integrally formed in the air bag casing 17 or may be manufactured separately from the air bag casing 17 and fixed to the air bag casing) is fixedly provided to the side walls 19 of the right and left end portions of the air bag casing 17. The right and left end portions of the air bag casing 17 are fixed to the glove door inner member 13 by causing the bolts to pass through the bolt holes 18*b* formed in the bracket 27 and screw-coupling the bolts to the threaded holes 13*b* formed in the glove door inner member 13.

Further, the afore-described structures of the impact wrench guide portion (impacter guide portion) 18*e* and the air bag restraining portion 18*f* among the structures unique to the second structural example of the first embodiment of the present invention are also applicable to the second embodiment of the present invention.

Effects and Technical Advantages Unique to the Second Embodiment of the Present Invention The effects and technical advantages commonly applicable to all embodiments of the present invention among the afore-described effects and technical advantages of the first embodiment of the present invention are also applicable to the second embodiment of the present invention.

Hereinafter, only effects and technical advantages unique to the second embodiment of the present invention will be explained.

In the second embodiment of the present invention, since the first portion 18 of the air bag casing 17 comprises the bottom wall 18 of the air bag casing, and the second portion 19 of the air bag casing 17 comprises the side wall 19 of the air bag casing, the first portion 18 and the second portion 19 can be constructed from a single air bag casing 17. As a result, the number of parts can be reduced as compared with a case where the first portion 18 and the second portion 19 are constructed from separate members.

Further, the afore-described effects and technical advantages of the impact wrench guide portion (impacter guide portion) 18*e* and the air bag restraining portion 18*f* among the effects and technical advantages unique to the second structural example of the first embodiment of the present invention are also applicable to the second embodiment of the present invention.

The invention claimed is:

1. A glove door-installed knee air bag apparatus comprising:
a glove door having a glove door inner member and a glove door outer member, the glove door inner member having a general plane, the glove door having an air bag module housing space therein; and
an air bag module including an inflator, an air bag and an inflator supporting member to which the inflator is fixed by a bolt,
wherein the inflator supporting member includes an inflator installing portion where the inflator is fixed to the inflator supporting member, the inflator installing portion being inclined relative to the general plane of the glove door inner member so that an entire portion of the bolt is located at a rear of the general plane of the glove door inner member; and
wherein the inflator supporting member includes a first portion which includes a portion parallel to the general plane of the glove door inner member and a second portion which includes a portion perpendicular to the general plane of the glove door inner member, the second portion being coupled to or formed integrally with the first portion, the inflator installing portion being formed at the first portion.

2. A glove door-installed knee air bag apparatus according to claim 1, wherein the bolt comprises a stud bolt, and wherein the inflator is fixed to the inflator installing portion of the inflator supporting member by the stud bolt which is fixed to an inflator installing bracket for holding the inflator and extends in the direction perpendicular to the inflator installing portion.

3. A glove door-installed knee air bag apparatus according to claim 1, wherein the inflator installing portion of the inflator supporting member is inclined downwardly at an angle in a range of 30-60 degrees relative to the general plane of the glove door inner member.

4. A glove door-installed knee air bag apparatus according to claim 1, wherein the inflator supporting member engages the rising wall of the air bag door at each of upper and lower end portions of the inflator supporting member.

5. A glove door-installed knee air bag apparatus according to claim 1, wherein a hook portion for causing the inflator supporting member to engage the rising wall of the air bag door is provided at each of upper and lower end portions of the inflator supporting member.

6. A glove door-installed knee air bag apparatus according to claim 1, wherein the inflator supporting member is fixed to the glove door at each of right and left end portions of the inflator supporting member.

7. A glove door-installed knee air bag apparatus according to claim 1, wherein a connector inserting aperture is formed in the inflator installing portion of the inflator supporting member.

8. A glove door-installed knee air bag apparatus according to claim 1, wherein the first portion of the inflator supporting member comprises a retainer and the second portion of the inflator supporting member comprises an air bag casing.

9. A glove door-installed knee air bag apparatus according to claim 8, wherein a center of the inflator fixed to the inflator installing portion of the inflator supporting member is offset in position from a vertical center of the air bag module housing space in a vertical direction of the glove door.

10. A glove door-installed knee air bag apparatus according to claim 8, wherein the inflator fixed to the inflator installing portion of the inflator supporting member is disposed at a lower end portion of the air bag module housing space.

11. A glove door-installed knee air bag apparatus according to claim 8, wherein a center of the inflator fixed to the inflator installing portion of the inflator supporting member is located substantially at a vertical center of the air bag module housing space.

12. A glove door-installed knee air bag apparatus according to claim 11, wherein an impact wrench guide portion, substantially parallel to an axis of the bolt, bent from the inflator installing portion and extending in a vertical direction relative to the inflator installing portion is connected to the inflator installing portion of the inflator supporting member.

13. A glove door-installed knee air bag apparatus according to claim 12, wherein an air bag restraining portion bent from the impact wrench guide portion and extending in a vertical direction relative to the impact wrench guide portion is connected to the impact wrench guide portion connected to the inflator installing portion of the inflator supporting member.

14. A glove door-installed knee air bag apparatus according to claim 1, wherein the first portion of the inflator supporting member comprises a bottom wall of an air bag casing and the second portion of the inflator supporting member comprises a side wall of the air bag casing.

15. A glove door-installed knee air bag apparatus according to claim 14, wherein a center of the inflator fixed to the inflator installing portion of the inflator supporting member is located substantially at a vertical center of the air bag module housing space.

16. A glove door-installed knee air bag apparatus according to claim 15, wherein an impact wrench guide portion, substantially parallel to an axis of the bolt, bent from the inflator installing portion and extending in a vertical direction relative to the inflator installing portion is connected to the inflator installing portion of the inflator supporting member.

17. A glove door-installed knee air bag apparatus according to claim 16, wherein an air bag restraining portion bent from the impact wrench guide portion and extending in a vertical direction relative to the impact wrench guide portion is connected to the impact wrench guide portion connected to the inflator installing portion of the inflator supporting member.

18. A glove door-installed knee air bag apparatus according to claim 1, further comprising:
   an air bag door fixed to the glove door outer member and having a rising wall rising around the air bag module housing space,
   wherein the inflator installing portion is inclined relative to the general plane of the glove door inner member in a vertical direction of the glove door,
   wherein the bolt extends in a direction perpendicular to the inflator installing portion, and
   wherein the glove door inner member includes an opening formed therein in front of the air bag module housing space, and a cover for covering the air bag module housing space, the bolt and the inflator supporting member from a front side thereof is coupled to the glove door inner member at the opening.

19. A glove door-installed knee air bag apparatus comprising:
   a glove door having a glove door inner member and a glove door outer member, the glove door inner member having a general plane, the glove door having an air bag module housing space therein;
   an air bag door fixed to the glove door outer member and having a rising wall rising around the air bag module housing space; and
   an air bag module including an inflator, an air bag and an inflator supporting member for supporting the inflator in the air bag module housing space,
   wherein the inflator supporting member includes an inflator installing portion where the inflator is fixed to the inflator supporting member, the inflator installing portion being inclined relative to the general plane of the glove door inner member in a vertical direction of the glove door,
   wherein the inflator is fixed to the inflator supporting member at the inflator installing portion by a bolt extending in a direction perpendicular to the inflator installing portion,
   wherein the glove door inner member includes an opening formed therein in front of the air bag module housing space, and a cover for covering the air bag module housing space, the bolt and the inflator supporting member from a front side thereof is coupled to the glove door inner member at the opening; and
   wherein the inflator supporting member includes a first portion which includes a portion parallel to the general plane of the glove door inner member and a second portion which includes a portion perpendicular to the general plane of the glove door inner member, the second portion being coupled to or formed integrally with the first portion, the inflator installing portion being formed at the first portion.

20. A glove door-installed knee air bag apparatus according to claim 19, wherein the bolt comprises a stud bolt, and wherein the inflator is fixed to the inflator installing portion of the inflator supporting member by the stud bolt which is fixed to an inflator installing bracket for holding the inflator and extends in the direction perpendicular to the inflator installing portion.

21. A glove door-installed knee air bag apparatus according to claim 19, wherein the inflator installing portion of the inflator supporting member is inclined downwardly at an angle in a range of 30-60 degrees relative to the general plane of the glove door inner member.

22. A glove door-installed knee air bag apparatus according to claim 19, wherein the inflator supporting member engages the rising wall of the air bag door at each of upper and lower end portions of the inflator supporting member.

23. A glove door-installed knee air bag apparatus according to claim 19, wherein a hook portion for causing the inflator supporting member to engage the rising wall of the air bag door is provided at each of upper and lower end portions of the inflator supporting member.

24. A glove door-installed knee air bag apparatus according to claim 19, wherein the inflator supporting member is fixed to the glove door at each of right and left end portions of the inflator supporting member.

25. A glove door-installed knee air bag apparatus according to claim 19, wherein a connector inserting aperture is formed in the inflator installing portion of the inflator supporting member.

26. A glove door-installed knee air bag apparatus according to claim 19, wherein the first portion of the inflator supporting member comprises a retainer and the second portion of the inflator supporting member comprises an air bag casing.

27. A glove door-installed knee air bag apparatus according to claim 26, wherein a center of the inflator fixed to the inflator installing portion of the inflator supporting member is offset in position from a vertical center of the air bag module housing space in a vertical direction of the glove door.

28. A glove door-installed knee air bag apparatus according to claim 26, wherein the inflator fixed to the inflator installing portion of the inflator supporting member is disposed at a lower end portion of the air bag module housing space.

29. A glove door-installed knee air bag apparatus according to claim 26, wherein a center of the inflator fixed to the inflator installing portion of the inflator supporting member is located substantially at a vertical center of the air bag module housing space.

30. A glove door-installed knee air bag apparatus according to claim 29, wherein an impact wrench guide portion, substantially parallel to an axis of the bolt, bent from the inflator installing portion and extending in a vertical direction relative to the inflator installing portion is connected to the inflator installing portion of the inflator supporting member.

31. A glove door-installed knee air bag apparatus according to claim 30, wherein an air bag restraining portion bent from the impact wrench guide portion and extending in a vertical direction relative to the impact wrench guide portion is connected to the impact wrench guide portion connected to the inflator installing portion of the inflator supporting member.

* * * * *